United States Patent [19]

van der Scheer et al.

[11] Patent Number: 4,556,530

[45] Date of Patent: Dec. 3, 1985

[54] METHOD FOR PRODUCING A VERY THIN DENSE MEMBRANE

[75] Inventors: Albert van der Scheer; Marinus J. Reynhout, both of Amsterdam, Netherlands

[73] Assignee: Shell Oil Company, Houston, Tex.

[21] Appl. No.: 634,848

[22] Filed: Jul. 26, 1984

[30] Foreign Application Priority Data

Aug. 2, 1983 [GB] United Kingdom ............... 8320797

[51] Int. Cl.$^4$ .............................................. B29D 7/02
[52] U.S. Cl. ................................... 264/298; 55/158; 210/500.2
[58] Field of Search ............... 264/41, 165, 216, 298; 55/158; 210/500.2

[56] References Cited

U.S. PATENT DOCUMENTS

| | | | |
|---|---|---|---|
| 3,767,737 | 10/1973 | Lundstrom | 264/298 |
| 4,132,824 | 1/1979 | Kimura et al. | 55/158 |
| 4,155,793 | 5/1979 | Salemme et al. | 264/298 |
| 4,192,842 | 3/1980 | Kimura | 264/298 |
| 4,279,855 | 7/1981 | Ward, III | 264/298 |
| 4,406,673 | 9/1983 | Yamada et al. | 55/158 |

FOREIGN PATENT DOCUMENTS 103929  8/1980  Japan ................... 264/298

*Primary Examiner*—James Lowe

[57] ABSTRACT

A very thin, dense membrane is produced by preparing a solution of a polymer and/or prepolymer and a substantially water insoluble surface active agent in an organic liquid, allowing the solution to spread spontaneously on the surface of a liquid support substantially consisting of a polar fluid and allowing the solution to desolvate and to react, if a prepolymer is present. The membrane so produced may be supported by a substrate comprising at least one porous layer.

13 Claims, No Drawings

METHOD FOR PRODUCING A VERY THIN DENSE MEMBRANE

FIELD OF THE INVENTION

The present invention relates to a method for producing a very thin, dense membrane and a dense membrane so produced.

BACKGROUND OF THE INVENTION

A membrane can be defined as a barrier separating two fluids, which barrier prevents hydrodynamic flow therethrough, so that transport between the fluids is by sorption and diffusion. The driving force for transport through the membrane is pressure, concentration or a combination of both. During operation permeate molecules dissolve into such a membrane at its upstream surface followed by molecular diffusion down its concentration gradient to the downstream face of the membrane. At the downstream face of the membrane the permeate is evaporated or dissolved into the adjacent fluid phase. The property of the membrane describing the rate of transport is called is permeability.

The importance of membranes in chemical technology for separating liquid and/or gaseous components from one another is rapidly growing, since the membrane permeation process is particularly useful as a separation technique whenever conventional separation methods cannot be used economically to get reasonable separation. Separation by means of membranes has a further advantage in that the components to be separated are not subjected to thermal loads and not changed in chemical structure.

Membranes can be distinguished as to their microstructural forms in porous ones and non-porous or dense ones. Membranes are usually nominated as porous when they contain voids that are large in comparison with molecular dimensions. Transport of permeates occurs within the pores of such membranes. Porous membranes have high transport rates which, however, is accompanied with a very poor selectivity for small molecules, and are therefore less suitable for gas separation techniques.

Dense membranes have on the contrary the ability to transport species selectively and are therefore applicable for molecular separation processes, such as gas purification. With such dense membranes, even molecules of exactly the sme size can be separated when their solubilities and/or diffusivities in the membrane differ significantly. A problem with dense membranes is the normally very slow transport rates. To attain acceptable transport rates, required for commercial application in separation processes where productivity is of paramount concern, it is necessary to make such membranes ultrathin. This can be construed from the following equation applicable for gas separation $$N = P\frac{(p_1 - p_2)}{L}$$

wherein N represents the permeation rate, P is the permeability i.e. product of solubility and diffusivity, $(p_1 - p_2)$ is the pressure difference over the membrane, and L is the membrane thickness. Similar equations are known for solid/liquid, liquid/liquid and gas/liquid separation by means of dense membranes.

From the above it will be clear that the amount of permeation per unit surface for a given material of the membrane and a given permeate depends upon the thickness of the membrane.

Various techniques are known for producing very thin membranes. The most common methods are melt extrusion, calendering and solvent casting. Melt extrusion should be carried out with rather complex equipment and it sets requirements, among others thermal stability, to the material to be extruded. Calendering does not permit the production of membranes with a thickness less than about 50 μm. The most preferred production method is solvent casting, which involves forming a solution of the membrane material, normally consisting of a polymer, and casting it onto a liquid substrate to produce a thin liquid layer which is then dried to form the solid membrane film. Essential in this method is that the solution has the ability to spread spontaneously onto the liquid substrate. In U.S. Pat. No. 4,192,842 a method for producing membranes is disclosed, wherein a solution of a methylpentene polymer in a solvent is spread out over a water surface. According to the disclosure in U.S. Pat. No. 4,192,842 the spreadability is enhanced by adding an organopolysiloxane-polycarbonate copolymer to the solution. It has been found that merely applying a solvent of a methylpentene polymer did not result in a dense, hole-free membrane, meeting the required selectivity for proper operation of the membrane.

Further examples of membrane production by solvent casting are given in European patent publication No. 31725. As described in the specification pertaining to this publication, an organic compound with a distribution coefficient of from 0.5 to 35 is preferably added to the polymer solution. The distribution coefficient is the ratio of the concentration of the organic compound in the polymer solution to that in water, forming the liquid substrate. According to said latter publication, the organic compounds may be alicyclic or aromatic alcohols, ketones, amines, aldehydes, carboxylic acids, peroxides and mixtures of these. Once the polymer solution with the above additional organic compound has been spread over a liquid support, it is believed according to said European patent publication that most of the additional organic compound is removed from the membrane forming solution by being dissolved in the liquid support. Although in first instance the organic compound may be a useful help in wide spreading of the polymer solution over the surface of a liquid support, the effect of the organic compound drastically diminishes due to its escape into the liquid support. This behavior of the organic compound means that during the drying of the polymer solution the surface tension of the liquid support is reduced, resulting in instability of the membrane and possible generation of holes in the membrane, especially when the membrane solidification process is rather slow and/or proceeds after the desolvation of the membrane.

SUMMARY OF THE INVENTION

A primary object of the present invention is therefore to provide a process independent of solidification time for producing a very thin, hole-free membrane with a uniform thickness.

Accordingly, the invention provides a process for producing a very thin, dense membrane, which process comprises preparing a solution of a base polymer or a base prepolymer and a substantially water insoluble surface active agent in an organic liquid, allowing the solution to spread spontaneously on the surface of a liquid support consisting of a polar fluid and allowing the solution to desolvate and to react, if a prepolymer is present, to effect the formation of a very thin dense membrane comprising said polymer and the water insoluble surface active support.

DESCRIPTION OF THE PREFERRED EMBODIMENT

The main feature of the above-noted process is the addition of a surface active agent to the polymer solution, which surface active agent should be substantially insoluble in the liquid support onto which the membrane is formed. The liquid support preferably substantially consists of water.

The surface active agent serves to lower the interfacial tension between the polymer solution and the liquid support sufficiently to allow the formation of a thin film on a liquid support. During the contact of the solution with the liquid support and the desolvation of the membrane forming solution the surface active agent remains in the organic solution so that the spreadability of the solution does not diminish upon desolvation. Such a reduction of the spreadability of the solution would lead to the formation of voids in the membrane.

Preferred surface active agents for use in the process according to the invention are chosen from the group of so-called dispersants as widely applied in lubricating oils for maintaining foreign particles in suspension within the oil. A further advantage of using dispersants consists herein that any particulates, such as dust particles etc., present, which can also be responsible for pinhole formation, will remain dispersed in the organic phase. Preferred examples of such dispersants for use in the process according to the invention are products prepared by reacting a polyalkenyl substituted succinic acid or anhydride, such as polyisobutylene maleic anhydride, with one or more polar compounds, such as polyalcohols, e.g. pentaerythritol or tris(hydroxymethylamino)methane, and/or polyamines, e.g., polyalkyleneamines such as tetraethylenepentamine and triethylenetetramine.

The base material used in the process according to the invention for preparing the membrane may be a homopolymer, a copolymer or a miscible mixture of polymers, or one or more prepolymers forming in the membrane preparation process a homopolymer, a copolymer or a mixture of polymers. Advantageously the base (pre)polymer has surface active properties, so that it forms an additional aid for lowering the interfacial tension between the solution and the liquid support. Typical examples of such base (pre)polymers are organosiloxanes such as (poly)dimethylsiloxane.

The solvent in the polymer solution may be selected from liquid organic compounds having, e.g. from one to ten carbon atoms per molecule, for example hydrocarbon; very good results have been obtained with 2,2,4-trimethylpentane. The solvent is preferably immiscible with the support liquid and is in the liquid state at the usual membrane preparation temperatures. Further, the solvent should preferably be so chosen as to be able to dissolve the polymer or the prepolymer in a considerable concentration.

The polar fluid used as liquid support in the process according to the invention preferably consists substantially of water, is preferably free of surfactants and preferably substantially free of particulates and other contaminants which might adversely affect the surface tension of the liquid substrate.

In the present process film-forming means may be used which can take a number of forms, well known in the art. The (pre)polymer solution can be deposited on the surface of the liquid support by means of for example a pipette which is held close to the water surface so that upon deposition the liquid surface is not disturbed. Suitable film forming means are for example described in U.S. Pat. No. 4,192,842 and in European patent publication No. 37125. Once the (pre)polymer solution has been spread onto the liquid support and a sufficiently thin liquid film has been formed, the liquid film is allowed to solidify and to react if a prepolymer is used to form a solid dense membrane. Before or after the solidification of the film, e.g., the evaporation of the solvent, the film is recovered from the liquid support surface by any suitable means. Preferably the formed membrane film is taken up on a microporous layer designed to serve as the substrate for the film. The operation of separating the film from the liquid surface may be batchwise or continuous. The microporous layer may be of any suitable material, such as porous polypropylene, cloths and wire net. Porous polypropylene is preferred in view of the adhesive bond of this material to a membrane formed of a (pre)polymer.

With the process according to the invention thin, hole-free membranes with a high selectivity and an acceptable throughput during operation can be produced. The thickness of a so produced membrane depends on the quantity of polymer solution added on the liquid support and can vary from some nanometers to a few micrometer.

The invention is further illustrated by the following Examples.

EXAMPLE I

A solution of polydimethylsiloxane in 2,2,4-trimethylpentane was prepared, to which solution 10 percent by weight on polydimethylsiloxane of a dispersant formed by polyisobutylene maleic anhydride triethylenetetramine (PMT) was added. This solution was used for forming a plurality of thin membranes, differing in thickness, by spreading the solution over a water surface between two barriers. The barriers were subsequently drawn away from one another, which action resulted in an enlargement of the surface area to which the polymer solution could spontaneously spread. The thickness of the polymer film on the surface was controlled by the degree of barrier widening. The so formed polymer films were taken up on a porous substrate of polypropylene. The interaction between the applied dispersant and the water forming the liquid substrate for the polymer solution was investigated by measuring the surface tensions of the water before and after the deposition of the polymer solution on the water surface. It was found that the surface tension had not been altered, so that substantially no dispersants had been dissolved in the water substrate.

From visual and microscopic inspections, it could be concluded that the formed membranes appeared to be hole free. To check this conclusion the membranes were subsequently subjected to gas permeation tests. For each of the membranes the permeability for $CO_2$, the separation factor $\alpha$ for a gas mixture of $CO_2$ and $N_2$, i.e. ratio of the permeability for $CO_2$ and the permeability for $N_2$, and the percentage of porous $N_2$ flux were measured. The results of these measurements are given in the following Table.

TABLE I

| $CO_2$ permeability $Nm^3/m^2 \cdot day \cdot bar$ | Effective thickness $\mu m$ | $\alpha$ $CO_2/N_2$ | Percentage porous $N_2$ flux | Percentage defective area |
|---|---|---|---|---|
| 73.6 | 2.9 | 11.03 | 0 | 0 |
| 155.2 | 1.4 | 10.35 | 0 | 0 |
| 244.3 | 0.9 | 10.15 | 0 | 0 |
| 364.0 | 0.6 | 10.36 | 0 | 0 |

The separation factor $\alpha$ appeared to be substantially independent of the thickness of the membranes, and substantially equal to that for the bulk material of which the membranes were made. This means that the membranes tested, even the thinnest ones were free of holes, in Table I indicated with defective area.

EXAMPLE II (COMPARATIVE)

The positive effect of the addition of a water insoluble dispersant to the polymer solution was demonstrated with the aid of a further series of tests. For these further tests, a solution of polydimethylsiloxane in 2,2,4-trimethylpentane was prepared, to which solution 10 percent by weight on polydimethylsiloxane of a surface active agent was added, the agent being Dobanol 91-8 ("Dobanol" is the trade name), i.e. an alcohol ethoxylate obtained by ethoxylating a linear primary alkanol having an average from 9 to 11 carbon atoms per molecule with on average 8 molecules of ethylene oxide per molecule of the alkanol. The so formed solution was used for producing a plurality of membrane films varying in thickness. These films were subjected to permeability and selectivity tests with $CO_2$ and $N_2$. The results of these tests are given in Table II.

TABLE II

| $CO_2$ permeability $Nm^3/m^2 \cdot day \cdot bar$ | Effective thickness $\mu m$ | $\alpha$ $CO_2/N_2$ | Percentage porous $N_2$ flux | Percentage defective area |
|---|---|---|---|---|
| 77.2 | 2.8 | 8.77 | 16 | 0.1 |
| 129.5 | 1.7 | 7.53 | 29 | 0.4 |
| 211.7 | 1.1 | 6.06 | 45 | 1.3 |
| 320.1 | 0.7 | 6.29 | 36 | 1.2 |

As shown in the above Table each of the membranes formed with Dobanol had a defective area, increasing with decreasing membrane thickness. Although the defective area seems rather small, it should be kept in mind that even minor amounts of holes seriously impair the selectivity of the membranes. Although in first instance the spreading behavior of the polymer solution with Dobanol was good, the solubility of the Dobanol in water caused a serious decrease of the surface tension of the water support, resulting in the formation of holes in the membrane film.

What is claimed is:

1. A process for producing a very thin, dense membrane which comprises (1) preparing a solution of a base polymer or a base prepolymer and a substantially water insoluble surface active agent in an organic liquid, (2) allowing the solution to spread spontaneously on the surface of a liquid support substantially consisting of a polar fluid and allowing the solution to desolvate and to react, if a prepolymer is present, thereby effecting the formation of a very thin dense membrane comprising said polymer and said water insoluble surface active agent.

2. The process of claim 1 wherein the polar fluid substantially consists of water.

3. The process of claim 1 wherein the surface agent is a dispersant.

4. The process of claim 3 wherein the surface active agent is a product prepared by reacting a polyalkenyl-substituted succinic anhydride with a polyalcohol.

5. The process of claim 4 wherein the surface active agent is polyisobutylene maleic anhydride polyalcohol.

6. The process of claim 3 wherein the surface active agent is a product prepared by reacting a polyalkenyl-substituted succinic anhydride with a polyalkyleneamine.

7. The process of claim 6 wherein the surface active agent is polyisobutylene maleic anhydride polyalkyleneamine.

8. The process of claim 1 wherein the base polymer or the base prepolymer is an organosiloxane.

9. The process of claim 8 wherein the base polymer is dimethylsiloxane.

10. The process of claim 8 wherein the base prepolymer is dimethylsiloxane.

11. The process of claim 1 wherein the organic solvent is a hydrocarbon solvent.

12. The process of claim 11 wherein the hydrocarbon solvent has from one to ten carbon atoms per molecule.

13. The process of claim 12 wherein the solvent comprises 2,2,4-trimethylpentane.

* * * * *